Nov. 17, 1959 — L. W. FREEMAN — 2,913,139
CONTAINER COVER
Filed March 14, 1956
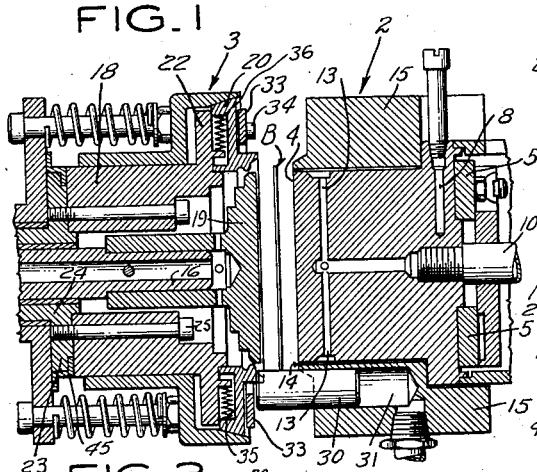
FIG. 1
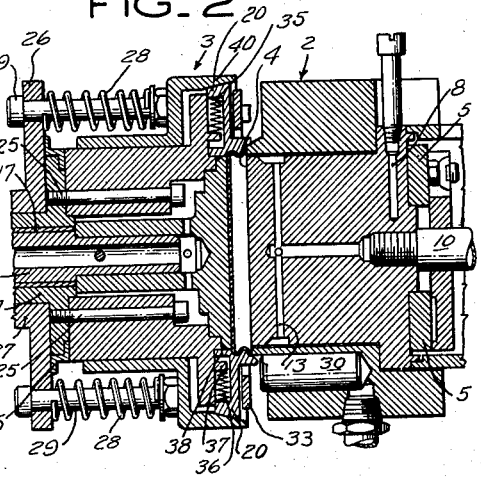
FIG. 2
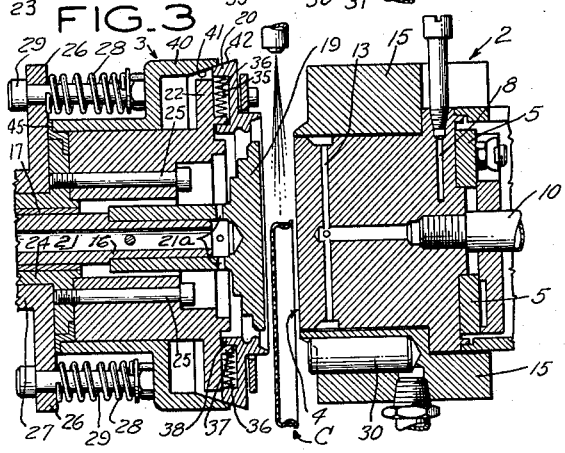
FIG. 3
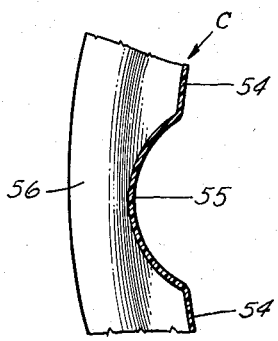
FIG. 5
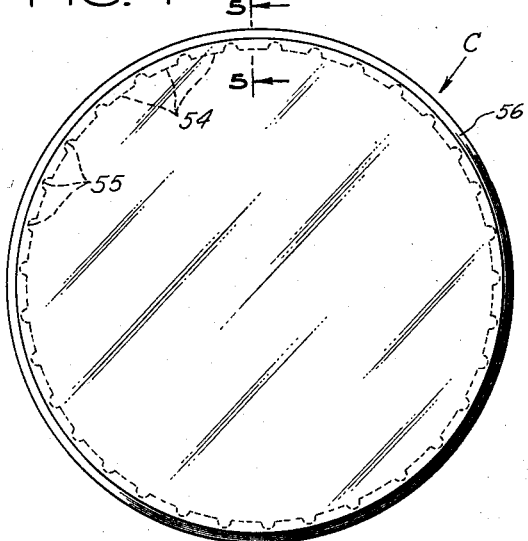
FIG. 4
FIG. 6
INVENTOR
LAWRENCE W. FREEMAN
BY Bates & Willard
ATTORNEYS

United States Patent Office 2,913,139
Patented Nov. 17, 1959

2,913,139

CONTAINER COVER

Lawrence W. Freeman, West Hartford, Conn., assignor to Plax Corporation, Bloomfield, Conn., a corporation of Delaware Application March 14, 1956, Serial No. 571,571

3 Claims. (Cl. 220—60)

The present invention relates to the reshaping of flat plastic material into hollowed or dished articles of various shapes. Generally, such sheet reshaping practices are referred to as sheet shaping or sheet forming operations. Despite any suggestion which the term may convey to the contrary, sheet shaping generally refers to the reshaping of sheet materials rather than to the initial shaping of the materials into sheet form.

The sheet materials to which the invention is applicable include most, if not all, of those which are either permanently or temporarily thermoplastic. Sheets of these materials may be manufactured in a variety of ways, as by extrusion, casting, drawing, calendering, pressing and numerous modifications and combinations thereof.

Heretofore attempts have been made to provide for rapidly drawing or otherwise shaping articles from sheets or webs of thermoplastic materials.

The problem of providing satisfactory forming methods and apparatus is particularly difficult for those thermoplastic sheet materials in which stretching stresses are captured. These captured stresses, which generally are referred to as orientation stresses, are introduced and captured both monoaxially and biaxially to improve the strength, flexibility and other characteristics of the sheet. Sheet material in which these orientation stresses are captured generally are referred to as oriented sheet.

Examples of such sheets are the biaxially oriented polystyrene and methacrylate sheet materials sold by the Plax Corporation under the trademark Polyflex* and Methaflex*, respectively.

Considerable difficulty has been encountered in finding a practice which is economically and commercially acceptable for forming articles from such sheet materials.

It is an object of this invention to provide improved articles of the nature indicated and improved method for their manufacture. The invention is particularly adapted to the manufacture of articles from oriented or otherwise prestressed sheet.

A more specific object of the present invention is to vary the orientation distribution in a repetitive pattern about the periphery of articles formed from oriented sheet and to control the molecular migration and distribution of the orientation stresses in accordance with a selected pattern.

As an example of the use to which the present invention is applicable, certain food products, such as cottage cheese, pickles, potato salad, etc., are now packaged in round, paraffin-coated paper containers. The salability of these products may be considerably enhanced with a transparent cover which reveals the contents of the package to the consumer.

The present invention provides improved transparent covers which are efficiently and economically produced from blanks of oriented thermoplastic sheet cut to size. These covers are non-toxic, tasteless, odorless, moisture-proof, and meet all sanitary standards.

\* Registered U.S. Patent Office.

In accordance with the invention, ribs provide the cover with peripherally spaced portions of greater orientation separated by portions of the annular gripping shoulder which is interrupted by the ribs. The annular gripping shoulder portions have less orientation and greater rigidity than the more flexible ribs which have greater orientation.

The alternate peripherally spaced portions of greater and lesser orientation provide a particularly novel and advantageous cover construction.

Other objects and advantages are indicated in or apparent from the following description of an illustrative embodiment of the invention which is made with reference to the accompanying drawing, in which:

Figs 1-3 are cross-sectional views showing successive positions of mold components in shaping plastic sheet material into covers in accordance with the invention;

Fig. 4 is an enlarged plan view of the container cover shown in Fig. 3;

Fig. 5 is an enlarged cross-section view taken on line 5—5 of Fig. 4 showing details of the periphery of the cover; and Fig. 6 is a cross-section view taken on line 6—6 of Fig. 5.

The apparatus shown in Figs. 1-3 for practicing the present invention is substantially the same as that illustrated and described in the copending U.S. Patent application Ser. No. 541,355, filed October 19, 1955, by E. Boyd Gardner.

*Press*

As shown in Figs. 1-3, there is provided a stationary press platten generally designated 2 and a movable press platten generally designated 3. The platten 2 has a flat circular forward face 4 and is heated by an electrical heating element 5, or other suitable heating means, which is secured in good heat-transferring engagement to the rear face of the platten 2. A thermocouple well 8 is provided in the platten 2 in which may be located the thermocouple of suitable temperature controls for maintaining the platten 2 within a desired temperature range for heating blank B when pressed against the platten face 4 to a proper molding temperature.

There is fastened to the platten 2 a tube or pipe 10 which is connected with a source of blowing air (not shown) for stripping the heated blanks B from the platten heating face 4. For this purpose, the tube 10 communicates through internal passages 13 with a fine annular orifice 14 which preferably is located adjacent the periphery of the circular heating face 4. As shown in the drawing, the annular orifice 14 may be provided between the cylindrical periphery of the platten face 4 and a fixed cylindrical sleeve 15.

As shown in Figs. 1-3, the mold platten 3 includes a main body portion 18 which is secured by bolts 25 to the forward flange 23 of a sleeve 24 which is advanced and retracted by a motor (not shown).

The forward end of the mold member 18 is provided with an annular flange 22 on the front surface of which individual segments 20 are slidably secured by means of a retaining ring 33 and bolts 34. Each of the segments 20 includes a chamber 35 containing a compression spring 36 which is compressed between the segment 20 and a stop 37 that projects from the flange 22 into the chamber 35. The springs 36 yieldably hold the individual mold segments 20 in the radially outermost positions permitted by engagement of each chamber wall 38 with its associated stop 37.

The segments 20 are forced inwardly to their molding positions shown in Figs. 1 and 2 by a camming ring member 40 which is slidably supported on the member 18. The ring member 40 includes an internal annular camming surface 41 which is tapered to conform to the tapered outer peripheral surface 42 of each segment 20 and cams the segments 20 inwardly to the molding positions shown in Figs. 1 and 2 against the yieldable force of the springs 36 when the ring 40 is advanced by a motor actuated sleeve 27 and springs 28.

More particularly, as shown in Figs. 1–3, the compression springs 28 are disposed on individual bolts 29 which are secured in the ring 40 and extend rearwardly therefrom through a flange 26 on the forward end of the sleeve 27. Each spring 28 is preloaded between the ring 40 and the flange 26. Secured to the mold 3 is a stop 45 that is engaged by and limits the retraction of the ring 40 as shown in Fig. 3. Retraction of the sleeve 27 causes the flange 26 and the bolts 29 to draw the ring 40 to the position shown in Fig. 3 in which the segments 20 are relieved of the restraint of the camming surface 41 and are forced outwardly by the springs 36 to the open-mold position.

Recessed within the mold member 18 is an inner mold member 19 which functions as a knockout or stripper plate for removing a molded article from within the molding cavity. During the molding operation, the member 19 is seated snugly against the mold member 18, as shown in Fig. 2, and is adapted to strip the molded plastic article from the mold cavity when the mold 3 including the main member 18 is retracted relative to the stripper plate 19 as shown in Figs. 1 and 3.

The member 19, as shown in the drawings, is a generally circular plate, a centrally disposed hub portion of which is pinned on the end of a shaft 16 which is slidably journaled in bushings 17 within the hollow sleeve 24.

An air passage 21 is provided in the shaft 16 and communicates through passages 21a with the space between the cavity in the mold 3 and the stripper plate 19.

The passages 21 and 21a provide for a blast of air to assist the stripper 19 in stripping a molded article from the cavity of the mold member 3 and to provide escape for air between the blank B and the mold 3 when the blank is forced into the cavity of the mold to form the article, as shown in Fig. 2.

As shown in Fig. 1, one or more pins 30 may be slidably journaled in the clamping sleeve 15 within individual bores 31 into the rear of which air under pressure is introduced to force the pins 30 outward against the closed segments 20 of the mold 3 so as to receive and support a blank B as shown in Fig. 1, preparatory to closing the mold members 2 and 3 and clamping the blank B therebetween for molding as shown in Fig. 2.

The temperatures of components of the shaping apparatus preferably are automatically controlled and maintained relative to the unmolding temperature of the plastic which is to be shaped. In the case of oriented polystyrene, which has an unmolding temperature of the order of 210° F., a temperature range of approximately 50°–200° has been found satisfactory for the mold 3 including the member 18 and the knockout plate 19, the temperatures of which may be controlled by suitable control means (not shown). While this temperature may be varied, it is desirable that the temperature be maintained substantially uniform through the molding surfaces of the members 18, 19 and 20 which are contacted by and shape the blank B.

The cylindrical clamping sleeve 15 preferably is held at a temperature slightly below the unmolding temperature as, for example, 200° F. and the member 2 is heated by the heater 5 so as to maintain the forming surface 4 somewhat above the unmolding temperature as, for example, in a 260–280° F. range.

In operating the molding apparatus shown in Figs. 1–3, a plastic disc or blank B is dropped onto the locating pins 30 as shown in Fig. 1 and the mold 3 advanced by the motor (not shown) so that the closed mold segments 20 center and grip the rim of the blank B against the clamping sleeve 15.

Thereafter air pressure introduced through the passageways 21 and 21a hold the blank B in over-all surface engagement with the heating surface 4 of the mold 2 while the blank is being heated.

Thereafter, the heated blank B is blown into the cavity formed in the mold 3 by the member 18, the knockout plate 19 and the closed mold ring segments 20 to mold the cover C, as shown in Fig. 2.

Thereafter, the camming ring 40 is retracted so that the mold segments 20 open responsive to the springs 36 and the mold 3 is retracted.

Rearward movement of the knockout member 19 is interrupted while the member 18 is further retracted, thereby stripping the cover C from the mold member 18, preferably aided by air pressure supplied through mold passages 21 and 21a.

The mold cavity shown in the drawing is shaped to produce the cap or cover C shown in Figs. 4–6 when the blank B is pressed into conforming engagement with the cavity as shown in Fig. 2.

The cap is adapted for use with containers which preferably have a rounded or beaded lip 50 as shown in phantom in Fig. 5.

The cover C may be curved as at 51 to conform closely to the lip 50 when the cover is applied as shown in Fig. 5. However, close conformity may be limited to the areas of reference numbers 52 and 53 without engagement in the area of reference number 51. It normally is sufficient for the engagement at 53 to hold the cover and container lip in tight sealing engagement at 52.

In accordance with the present invention, the cover C is formed from blank B of highly biaxially oriented polymer such as polystyrene. The portion of the cover C at and below the retaining shoulder 53 which is adapted to underlie the container lip or rim 50 preferably is provided with spaced portion 54 of lesser orientation separated by portions 55 of greater orientation at regular repetitive spacing about the circumference of the cover C. The portions 55 of greater orientation may be provided in the form of regularly spaced ribs each of which extends from the upper curved portion 51 to the lower lip 56 of the cover intermediate the lesser stretched and oriented recess portions 54.

Thus the annular gripping shoulder portions 53 have less orientation and greater rigidity than the ribs 55 which provide flexibility and elasticity to facilitate the applying and removing the cover C.

Moreover, the ribs 55 provide reinforcement which contributes to the shape stability of the cover and reduces warpage and distortion.

For maximum effectiveness, the stretching of the highly oriented blank B should be effected quickly and the shaped article quickly chilled so as to retain and capture as much as possible of the orientation stresses produced by blow molding in addition to the orientation stress of the blank B.

Obviously those skilled in the art may make various changes in the details and arrangement of parts without departing from the spirit and scope of the invention as defined by the appended claims, and I therefore do not wish to be restricted to the precise construction of the illustrative embodiments disclosed.

Having thus disclosed embodiments of my invention, I claim:

1. A container cover formed from biaxially oriented thermoplastic material, comprising: a cover body portion, a peripheral skirt extending laterally of said body portion and inwardly to form an inwardly facing peripheral groove adjacent the perimeter of said body portion, said skirt having a portion extending outwardly from said inwardly facing groove and forming an outwardly facing peripheral groove immediately adjacent said inwardly facing groove, said outwardly extending portion of said skirt terminating at its outer end in a peripheral lip, said inwardly extending portion of said skirt forming a part of the outwardly facing groove and providing an inwardly extending shoulder, said outwardly facing groove being bridged at spaced intervals by bridging ribs which extend across said outwardly facing groove, said ribs forming inwardly facing grooves permitting said shoulder to expand outwardly to facilitate removal and application of said cover to a container to be closed, said ribs having greater orientation of the thermoplastic material therein than the orientation of the thermoplastic in the portions of said shoulder between said ribs whereby said portions of the shoulder between said ribs have greater rigidity in comparison with the flexibility of said ribs to promote said shoulder's gripping of the lip of a container to be closed.

2. The cover recited in claim 1 and wherein said ribs are regularly spaced and parallel and extend from the lip to said shoulder of the cover in the outwardly facing peripheral groove between said shoulder and lip.

3. The cover recited in claim 2 in combination with a container having a peripheral lip and wherein said shoulder and ribs of the cover are adapted to engage and underlie the lip of said container and releasably retain the cover pressed on top of said container.

References Cited in the file of this patent
UNITED STATES PATENTS

| | | |
|---|---|---|
| 1,921,682 | Loeber | Aug. 8, 1933 |
| 2,466,666 | Smith | Apr. 12, 1949 |
| 2,614,727 | Robinson | Oct. 21, 1952 |
| 2,759,217 | Peterson | Aug. 21, 1956 |